United States Patent
Kritz

[11] 3,735,200
[45] May 22, 1973

[54] WHEEL SLIP SENSOR
[75] Inventor: Jacob A. Kritz, Westbury, N.Y.
[73] Assignee: Sperry Rand Corporation, New York, N.Y.
[22] Filed: Dec. 8, 1971
[21] Appl. No.: 205,960

[52] U.S. Cl. .................. 317/5, 303/21 P, 303/21 BE
[51] Int. Cl. ................................................ B60t 8/06
[58] Field of Search ............................ 317/5, DIG. 1; 310/8.1; 303/21 R, 21 A, 21 BE, 21 EB, 21 P; 340/258 A; 307/233; 324/160, 161, 175, 178

[56] References Cited
UNITED STATES PATENTS
3,701,568  10/1972  Lewis et al. ...................... 303/21 P
3,583,773  6/1971   Steinbrenner et al. ........... 303/21 EB
3,510,590  5/1970   Golla ................................. 307/233 X

*Primary Examiner*—J. D. Miller
*Assistant Examiner*—Harry E. Moose, Jr.
*Attorney*—Howard P. Terry

[57] ABSTRACT

Slippage of a drive wheel in a land vehicle is detected by means of doppler shifts induced in pulsed ultrasonic beams. First and second transducers transmit bursts of ultrasonic energy which are directed at the wheel surface and the ground surface, respectively. The doppler shifted return pulses are detected by respective transducers and processed in separate channels. Counters in each channel generate gate signals indicative of the length of time that is required for the corresponding transducer to receive a predetermined number of cycles of reflected energy. An up-down counter operates from a high frequency clock in response to the two gate signals. The difference in duration of the two gate signals leaves a differential count accumulated in the up-down counter which represents the slip between wheel and ground surfaces.

7 Claims, 2 Drawing Figures

Patented May 22, 1973 3,735,200

WHEEL SLIP SENSOR

BACKGROUND OF THE INVENTION

1. Field of the Invention

The present invention relates to velocity detection means and more specifically to vehicle skid detection means.

2. Description of the Prior Art

When land vehicles, such as motor vehicles, are operated over non-ideal surfaces such as those exposed to rain, ice or mud, the proper application of braking force or driving torque requires the sensing of incipient skid or loss of traction conditions. Prior art systems have been devised in which abrupt changes in wheel speed are sensed. However, such systems do not consider the simultaneous measurement of torque speed with respect to the ground surface. Because of this shortcoming, the prior art devices cannot detect early and sensitive conditions that require correction. The present invention concerns apparatus for automatically detecting and measuring skid or traction loss experienced by a vehicle by continuously measuring the relative peripheral velocity of the wheel and the ground surfaces.

SUMMARY OF THE INVENTION

Incipient skids and losses in traction experienced by land vehicles are detected by measuring the comparative doppler shifts occurring in beams of ultrasonic energy reflected from the surface of a drive wheel and from the adjacent grounds surface. The magnitude and sense of the differential doppler shift is used to determine the magnitude and the nature of any slippage that occurs.

DESCRIPTION OF THE PREFERRED EMBODIMENT

The present invention utilizes the doppler frequency shift in beams of ultrasonic radiation to detect velocity changes.

Figure 1:
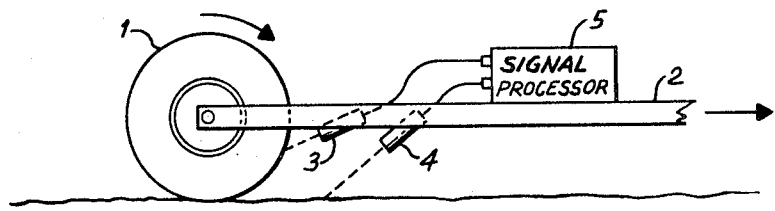
FIG. 1 is a schematic drawing useful in explaining the invention.

FIG. 1 indicates the manner in which the principles of the invention may be applied to a land vehicle. A supporting wheel 1 is carried on the vehicle frame 2. A first ultrasonic transducer 3 is directed so as to radiate a beam of ultrasonic energy toward a surface on the wheel 1. Similarly, a second ultrasonic transducer 4 is arranged to direct a beam of ultrasonic energy at the adjacent ground surface.

In most applications, the wheel 1 will be a drive wheel which serves to propel the vehicle. In such instances, the wheel may slip during acceleration so as to experience a loss of traction. When braking forces are applied to the wheel, skid conditions may be encountered wherein the wheel surface velocity becomes less than the velocity of the adjacent ground surface with respect to the vehicle.

In some instances, the apparatus of the invention may be applied to a wheel which merely supports the vehicle. In such instances, braking may be applied to the wheel wherein skid conditions may be encountered; however, loss of traction conditions will not be encountered in such instances.

The transducers 3 and 4 are energized from electronic circuits in a signal processor 5. The signal processor also contains electronic circuits capable of processing the electrical signals resulting from energy reflected from the various surfaces.

The ultrasonic transducers are mounted on the vehicle frame so as to produce highly directive ultrasonic beams. In actual practice, the ultrasonic energy reflected from the surfaces are spectra whose center frequencies are each shifted from the source frequency by an amount proportional to the relative speed of the ultrasonic target area and the transducer as defined by well known doppler equations.

The electrical signals resulting from energy returned to the transducers 3 and 4 are delivered to the signal processor which operates on these signals to generate an output indicative of the magnitude and sense of the differential velocity so as to indicate the magnitude and nature of the slippage.

Figure 2:
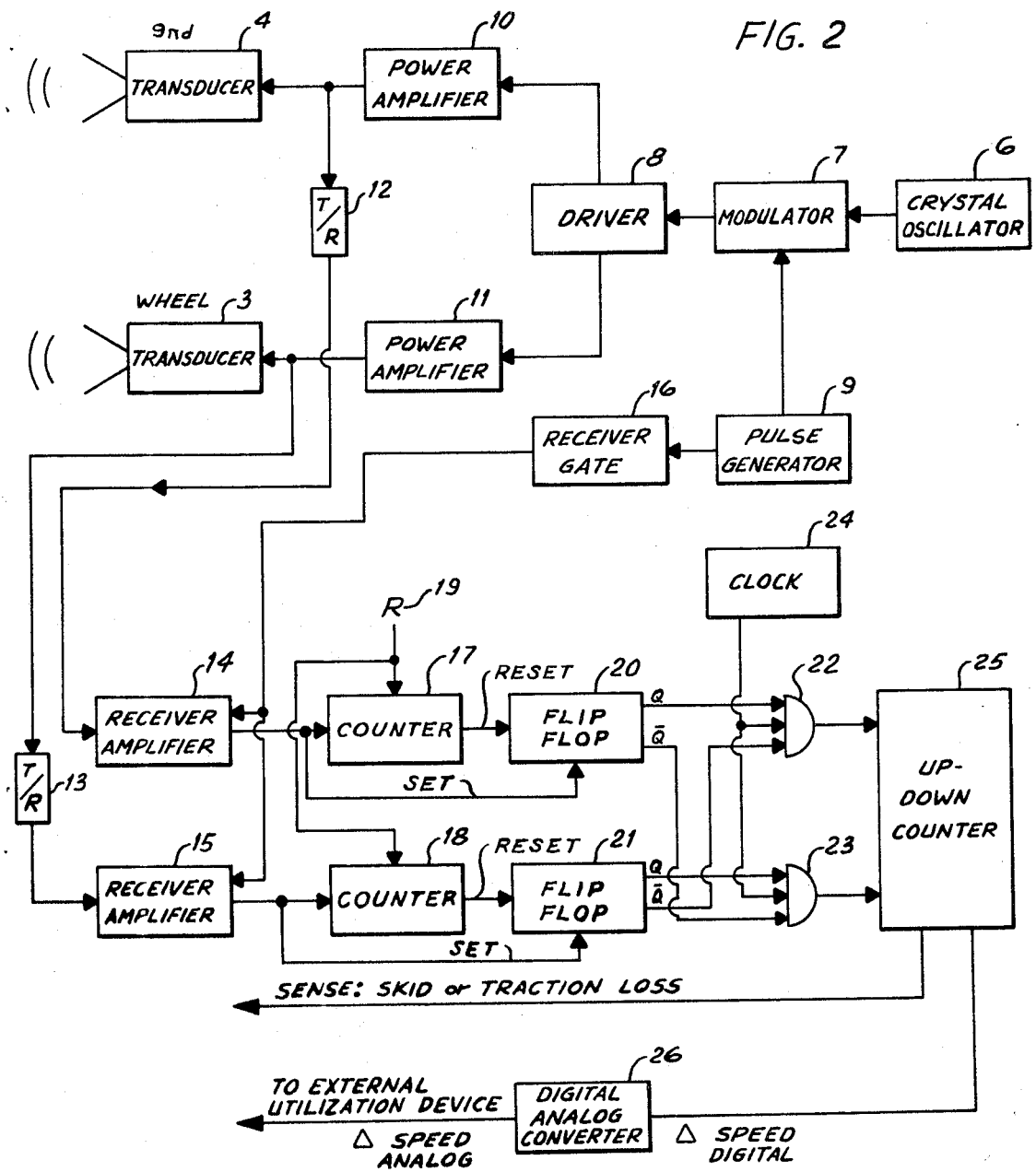
FIG. 2 is a functional block diagram illustrating an electronic circuit useful in practicing the invention.

FIG. 2 is a functional block diagram of a circuit that may be used in practicing the invention. The two transducers 3 and 4 are excited by shaped pulses of carrier frequency. The carrier frequency is generated by a crystal oscillator 6 and controlled by a modulator 7 which passes pulses to a driver circuit 8 in response to suitable pulses from a pulse generator 9. The driver circuit applies suitably shaped pulses of carrier frequencies through the power amplifiers 10 and 11 to the transducers. In an actual system, some pulse shaping is preferred in the driver and power amplifier circuits so as to eliminate sharp rise and fall edges of the carrier pulse that might otherwise be applied to the transducers. Such sharp rise and fall times may cause a "ringing" in the transducers since they may be shock excited at their natural resonant frequencies and these frequencies may be different from the frequency generated by the crystal oscillator.

Reflected pulses are subsequently received by the two transducers and applied to separate receive channels through conventional transmit-receive circuits 12 and 13. The signals from the transducers are then amplified in suitable receiver amplifiers 14 and 15. The transmit-receive circuits serve to block transmit pulses from the receiving amplifiers but operate to permit the relatively weak signals from the transducers to flow to these amplifiers. The receiver amplifiers are gated off by means of a receiver gate circuit 16 during the time that the pulse generator permits the modulator 7 to operate in the transmit mode. Preferably, the receiver gate 16 maintains the receiver amplifiers in the off condition throughout a predetermined period immediately following the transmit pulse so as to render the circuit insensitive to local disturbances arising near the transducers. When the receiver gate subsequently enables the receiver amplifiers, the received signals from the ground and wheel surfaces are amplified and passed to counters 17 and 18.

The predetermined counters 17 and 18 are reset to a zero condition through a conventional reset terminal 19 which may be actuated, for instance, by a transmit pulse.

The predetermined counters are conventional devices that operate to produce a gate signal when the counter experiences a predetermined number of zero crossings.

As indicated in FIG. 2, a receiver amplifier passes a flip-flop set signal to an associated flip-flop 20 or 21. This signal switches the flip-flop into a first stable state. When the predetermined counter subsequently detects a predetermined number of oscillations, a reset signal is applied to the flip-flop so as to return the flip-flop to its previous stable state.

In this manner, each flip-flop produces a steady enabling pulse having a duration equal to the time necessary for the associated counter to reach the predetermined condition.

Ordinarily, the counters 17 and 18 are adjusted to reach the "predetermined" condition after receiving the same number of oscillatory signals from the corresponding receiver amplifier. For the same predetermined value, however, two different gate intervals will be generated if the doppler shifts in the two channels are different. For example, if the ground speed is higher than the wheel speed (denoting a skid condition), the counter 18 will overflow before the counter 17.

In practice, the counters are set so that they operate in response to a number of pulses that is slightly smaller than the total number of cycles transmitted in a given burst so as to insure that there is always a sufficient number of pulses to cause the counters to reach the predetermined state.

Each of the flip-flops contain a pair of output terminals. The Q output terminal produces a direct output signal when the flip-flop is in a bistable state indicating that the associated counter is counting. A $\bar{Q}$ terminal on each flip-Flop provides a complementary output signal when the flip-flop is in the opposite binary state.

The Q output terminals of the flip-flops 20 and 21 are connected directly to the input terminals of AND gates 22 and 23, respectively. The $\bar{Q}$ output terminals of the flip-flops 20 and 21 are cross-connected to the input terminals of the AND gates 23 and 22, respectively. A third input terminal on each of the AND gates is energized by a high frequency clock source 24. The output signals from the AND gates 22 and 23 are applied to a conventional up-down counter 25.

During the time that the predetermined counter 17 is counting, the flip-flop 20 provides an input signal to the gate 22. Similarly, during the time that the predetermined counter 18 is counting, the flip-flop 21 provides an input signal to the corresponding gate 23. However, during the time that both predetermined counters are counting, neither gate 22 nor gate 23 can pass an output signal to the up-down counter 25. However, assume that the counter 18 reaches the predetermined condition before the counter 17 reaches this condition. When the counter 18 produces a reset signal, the flip-flop 21 is switched to the opposite binary state and immediately produces an output voltage at the terminal $\bar{Q}$ which is applied to the gate 22. The gate 22 now receives input signals at two of its three input terminals. Clock pulses from the source 24 can now pass through the gate 22 so as to actuate the up-down counter 25.

Conversely, if the predetermined counter 17 reaches the predetermined condition before the counter 18, the gate 23 will pass clock pulses to the up-down counter during the time that only one of the predetermined counters is counting. In this way, the up-down counter receives clock pulses only during a time indicative of the difference in time intervals required for the two predetermined counters to reach the predetermined condition This, in turn, indicates the differential doppler frequency shift experienced by the two ultrasonic beams.

The up-down counter 25 is arranged to count in one direction in response to signals from the gate 22 and in the opposite direction in response to signals from the gate 23. Since the frequency of the clock 24 is closely regulated, the count accumulated by the up-down counter 25 is an accurate indication of the desired time differential.

The magnitude of the count accumulated in the counter 25 indicates the magnitude of the differential speed being sensed. An output signal in digital form may be taken from the counter 25 and then processed in a conventional digital-analog converter 26 so as to produce an analog signal representative of the differential speed that may be used by suitable external utilization devices.

A second signal may be taken from the up-down counter 25 which indicates the sense of the count accumulated at the counter 25. This latter signal indicates whether the differential speed represents skid or traction loss.

The predetermined counters and the flip-flops, together with the up-down counter, effectively operate as a comparator circuit in order to supply output signals representing the magnitude and sense of the differential velocities being detected by the transducers.

The individual components in the comparator section of the present system are known in the art. A typical comparator circuit, for instance, is disclosed in copending U.S. patent application Ser. No. 159,853 filed in the names of Jacob A. Kritz and Seymour D. Lerner and assigned to the present assignee. That copending application relates to apparatus for determining the velocity of marine vessels by detecting the doppler shift in pulsed ultrasonic beams reflected from the ocean floor.

Although the present invention preferably uses the pulsed system as indicated in FIG. 2, variations of this system will occur to those skilled in the art. The pulsed method as presently preferred, permits a single transducer to be used in each channel for both transmitting and receiving acoustic energy since the receiving period occurs between bursts of transmitted energy. This reduces the required complement of transducers from four to two and is important in the intended applications since the transducers are expensive and exposed to a hostile environment. Thus, reducing the number of transducers increases the reliability of the instrument. In addition, although a continuous wave system might be employed in practicing the invention, the pulsed method permits deactivation of the receiver for those time periods not associated with desired target returns. This eliminates interference from those signals which would otherwise be received in response to air turbulence, dust and flying debris that would otherwise cause errors.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. A wheel slip sensor for a land vehicle propelled by a driver wheel comprising first and second acoustic transducers disposed to irradiate a surface of said wheel and the surface being traversed by said vehicle respectively, means for periodically energizing both of said transducers so as to produce simultaneous bursts of oscillatory acoustic energy, said transducers being further responsive to energy reflected from the respective surfaces so as to produce oscillatory electrical signals corresponding to the received acoustic energy, first and second receive channels for processing the electrical signals produced by said first and second transducers respectively, means to actuate both of said receive channels at a predetermined time after the termination of each burst of transmitted energy, means in each receive channel for producing an enabling pulse having a duration that is a function of the frequency of the oscillatory signal in that channel, means to determine the difference in duration of the enabling pulses in the two receive channels, and means to produce output signals representative of said difference in pulse duration.

2. The sensor of claim 1 in which the enabling pulse producing means in each receive channel includes a predetermined counter, a flip-flop, means for simultaneously resetting the predetermined counters in both channels, and means for setting a flip-flop into a first stable state in response to an input signal applied to the predetermined counter in the same channel, each of said predetermined counters being arranged to reset the flip-flop in the same channel to a second stable state when the counter reaches the predetermined condition, each flip-flop having a direct output terminal for providing an enabling pulse during the time that the flip-flop is in said first stable state.

3. The sensor of claim 2 in which each of said counters is set to reach the predetermined condition after accumulating the same number of counts and in which each flip-flop further contains a complementary output terminal connected to be energized when the flip-flop is in said second stable state, said means for determining the differential in enabling pulse duration including an AND gate in each receive channel, each of said AND gates being responsive to the enabling pulse from the flip-flop in that channel and to a voltage appearing on the complementary output terminal of the flip-flop in the opposite receive channel.

4. The sensor of claim 3 further including an up-down counter arranged to be actuated in the "up" mode in response to an output signal from one of said AND gates and in the "down" mode in response to an output signal from the other of said AND gates.

5. The sensor of claim 4 further including a source of clock pulses and means to apply said clock pulses to the inputs of each of said AND gates, whereby either AND gate passes a train of clock pulses when and only when the flip-flop in the corresponding receive channel is in said first stable state and the flip-flop in the opposite channel is in said second binary state.

6. The sensor of claim 5 in which the up-down counter is arranged to count the number of clock pulses produced by said AND gates.

7. The sensor of claim 6 further including means to produce a first output signal indicative of the number of pulses accumulated by said up-down counter and a second output signal indicative of the mode in which the accumulated count is changing.

* * * * *